FIG. IA

INVENTORS.
CHARLES P. ROHMANN
WILLIAM F. STAHL
ROBERT B. WATROUS
JOSEPH H. WISEMAN JR.
BY
Arthur H. Swenson
ATTORNEY.

Dec. 14, 1965   C. P. ROHMANN ET AL   3,223,106
CONTROLLER

Filed Aug. 31, 1961   9 Sheets-Sheet 7

FIG. 12

INVENTORS.
CHARLES P. ROHMANN
WILLIAM F. STAHL
BY ROBERT B. WATROUS
JOSEPH H. WISEMAN JR.

Arthur H. Swanson
ATTORNEY.

Dec. 14, 1965  C. P. ROHMANN ETAL  3,223,106
CONTROLLER
Filed Aug. 31, 1961  9 Sheets-Sheet 9

INVENTORS.
CHARLES P. ROHMANN
WILLIAM F. STAHL
BY ROBERT B. WATROUS
JOSEPH H. WISEMAN JR

ATTORNEY.

3,223,106
CONTROLLER
Charles P. Rohmann, Hatboro, William F. Stahl, Warminster, and Robert B. Watrous and Joseph H. Wiseman, Jr., Philadelphia, Pa., assignors to Honeywell Inc., a corporation of Delaware
Filed Aug. 31, 1961, Ser. No. 135,373
5 Claims. (Cl. 137—86)

Many industrial processes are operated by means of one or more final control elements, such as valves, which govern the supply of fuel or other control agent to the process. Such a final control element may be operated by manually operable means or by automatically operable means. These automatically operable means include means for sensing the deviations of some variable from a set or selected value. These deviations are sensed by a measuring instrument which responds to changes in the chosen variable and converts such changes into variations in an air pressure. This variable air pressure is transmitted to a controller and thence to the air-pressure-operated motor for the final control element or valve. The manually operable means for actuating the final control element are similar to the automatically operable means just described. These manually operable means comprise, in their simplest form, a manually operable valve for causing variations in an air pressure which is applied, either directly or after it has been amplified, to the air-pressure-operated motor for the final control element.

It is likewise known to include a means for automatically operating the final control element by what is known as "cascade" control. In the "cascade" type of control, two controllers are employed, each responding to a different variable. One of these controllers is connected so as to adjust the set point of the other controller.

It is also known to include a means for operating the final control element by operating the set point of a controller by an air pressure which may be varied manually or automatically at a location remote from the controller and transmitted to the controller. This set point pressure is called the external set point pressure. This mode of operation is called "tracking."

It is an object of this invention to provide means whereby the control of the final control element may be transferred from the manually operable means to the automatically operable means or vice-versa without disturbance of the position of the final control at the time transfer is made. This is particularly advantageous if the final control element constitutes the final control element of apparatus controlling an industrial process because changes in the position of such a final control element cause changes in the industrial process. These changes cannot be quickly eliminated and consequently there is a disturbance of the process under control and resulting loss of efficiency or damage to the apparatus carrying out the process or to the plant in which the apparatus is housed.

It is also an object of this invention to provide means whereby a final control element may be controlled manually, automatically or by the "cascade" mode of operation and whereby this control can be transferred from one of these modes of operation to another.

An additional object of this invention is to provide means whereby a final control element may be controlled manually, automatically or by the "tracking" mode of operation and whereby this control can be transferred from one of these modes of operation to another.

More specifically, it is an object of this invention to provide means whereby control of a final control element can be shifted from manual to automatic or vice-versa by turning a handle continuously in one direction, this handle being arranged to control a number of valves which make and break suitable connections so that the transfer of the control is effected smoothly and without "bump" or other interruption to the process under control.

More specifically, it is an object of this invention to provide a manually operable transfer switch having a plurality of stationary ports and one or more movable discs containing a plurality of ports which cooperate with the stationary ports to make and break the desired pneumatic connections.

It is a further object of this invention to provide a device for manually operating the final control element of an industrial process, which device includes an indicator-transmitter, including, a pointer, which may be manually operated as a handle to vary an output pressure which is applied through the transfer switch to the final control element.

An additional object of this invention is to provide an indicator-transmitter which includes a stationary clutch which permits the handle-pointer to move freely or to move with a friction drag, this clutch being under the control of the handle which operates the transfer switch.

Yet another object of this invention is to provide an indicator-transmitter having means manually operable by handle which operates the transfer switch for causing the indicator-transmitter to operate as a receiver or as a transmitter under the control of the pointer which manually operates the indicator-transmitter as a transmitter.

A better understanding of the present invention may be had from the following detailed description when read in connection with the accompanying drawings, in which:

FIG. 2 is a diagram with parts in cross section and parts in cross section perspective showing the parts of this invention and the pneumatic circuits between.

BLOCK DIAGRAM

Figure 1A:
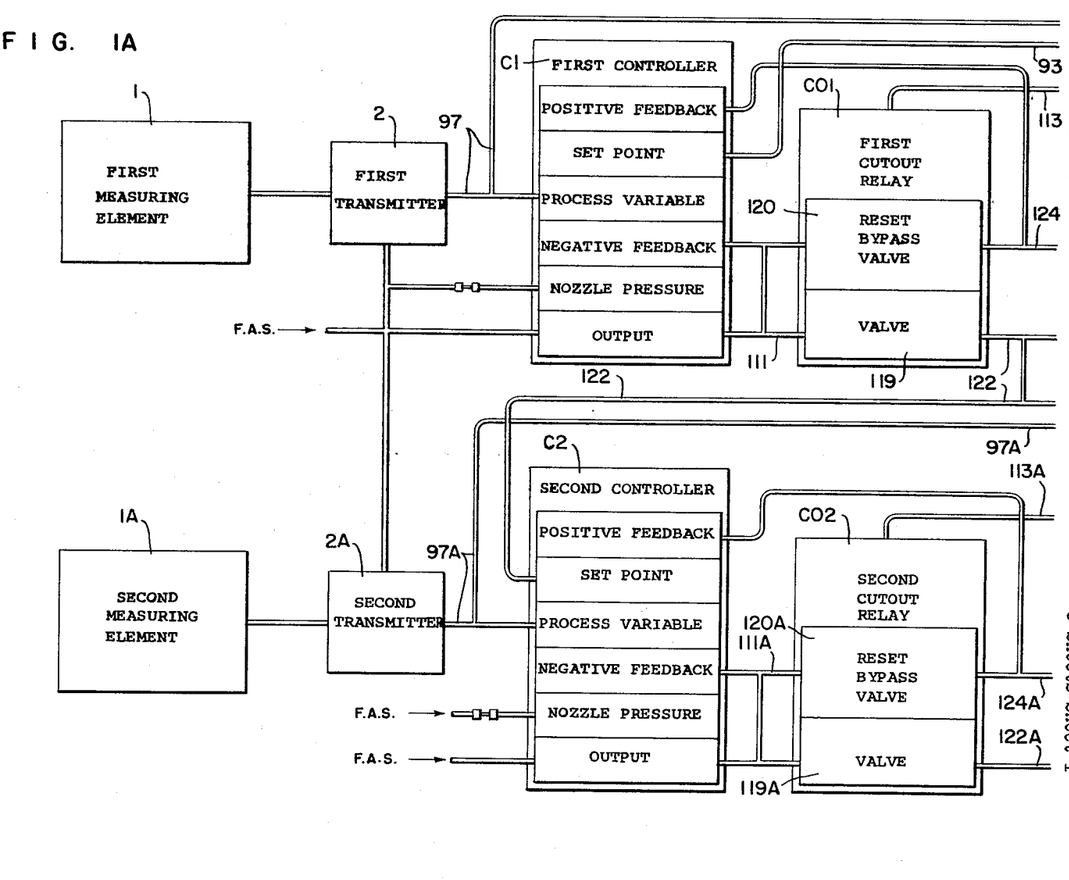
FIGS. 1A and 1B are, respectively, the left side and the right side of a block diagram showing this invention.
Figure 1B:
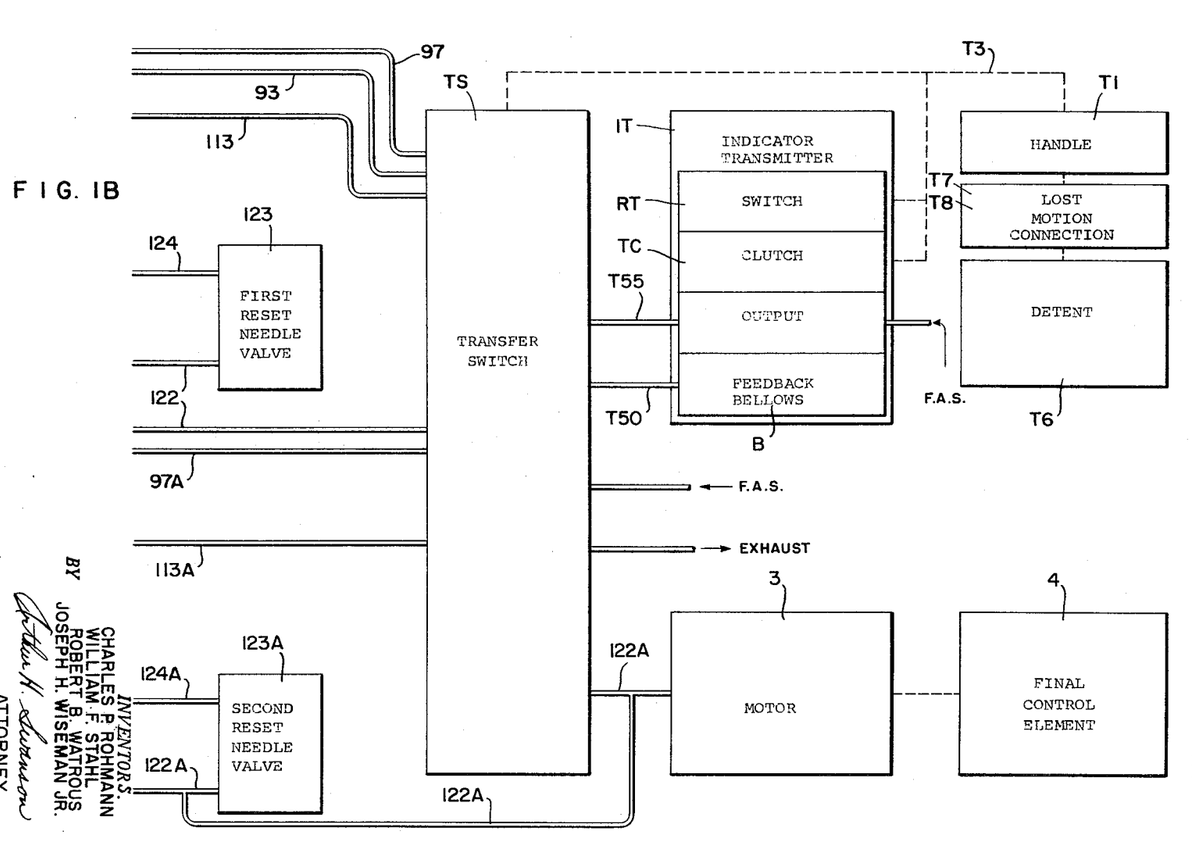

The first controller C1 and the first cutout relay CO1 (disclosed in greater detail hereinafter) are substantially duplicates of the second controller C2 and the second cutout relay CO2. Therefore, in FIGS. 1 and 2 but one of these controllers and one of these cutout relays will be described. Similar elements of the second controller and of the second cutout relay will be given the same reference character as the reference character applied to the corresponding parts in the first controller and in the first cutout relay with the addition of the distinguishing letter A.

Referring to FIGS. 1A, 1B, a first measuring element 1 senses the changes in a first process variable PV1. A great number of such measuring elements are known for sensing the changes in a great number of variables such as temperature, pressure, flow and the like. Measuring element 1 operates an air-pressure-operated transmitter 2 which converts the changes sensed by the measuring element 1 into changes in an air pressure. Examples of such a measuring element and of such a transmitter are found in U.S. Patent 2,311,853; C. B. Moore; patented February 23, 1943.

Figure 2:
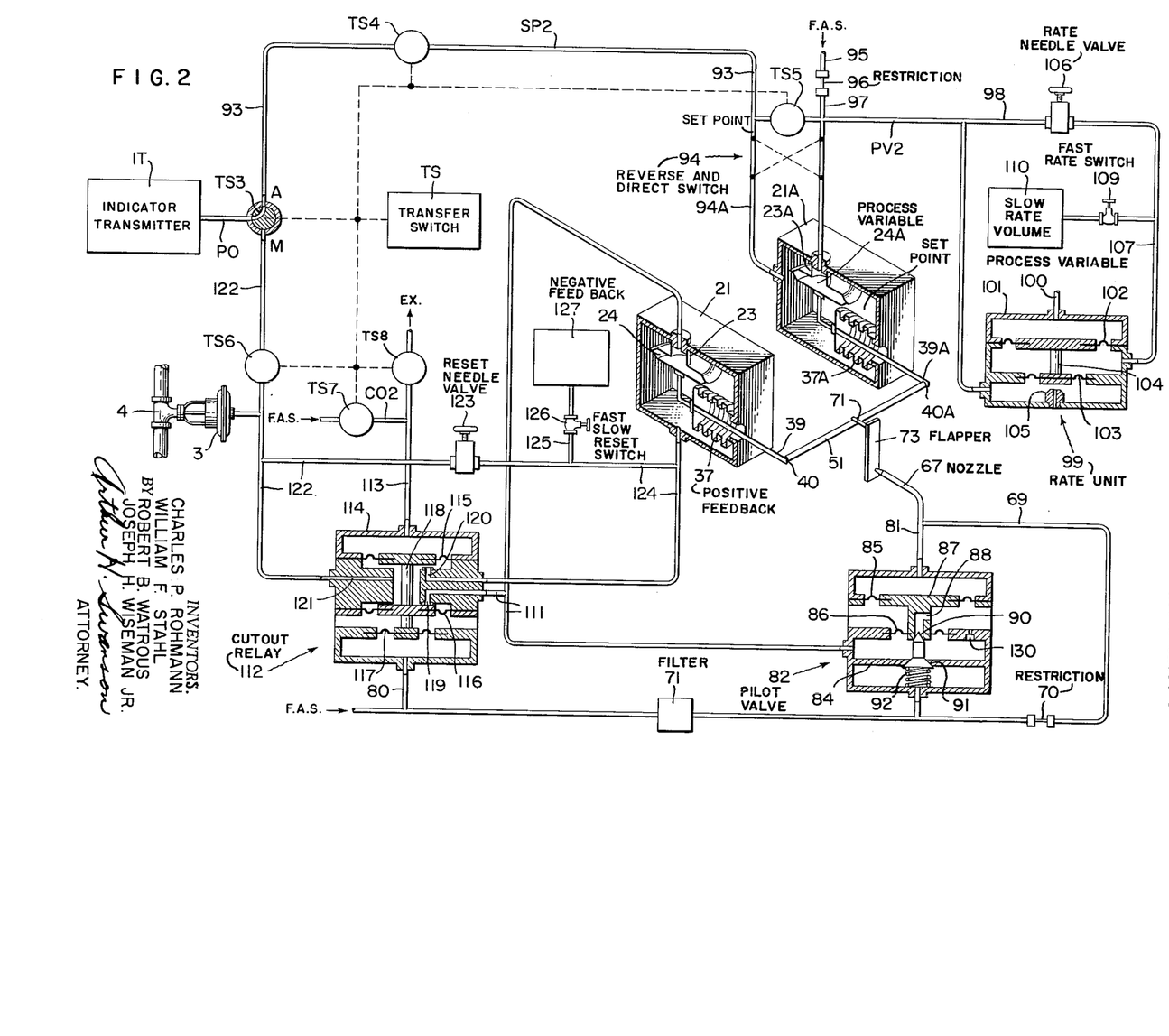

The changes in pressure of transmitter 2 are transmitted by pipe 97 to transfer switch TS shown in FIG. 1B and to the process variable chamber or portions of first controller C1. A number of types of such controllers are known. One such type of controller is shown in FIG. 2 of this application and is described in greater detail hereinafter. Such controllers operate in a well-known manner to produce output-air pressure. The output pressure O1 of the controller C1 is transmitted by pipe 111 to the negative feedback portion of the controller C1 and to the first cutout relay CO1 which contains two valves. Valve 119 controls the output pressure O1 of the controller C1. Valve 120 provides a by-pass which renders the reset needle valve 123 of the controller C1 operative or inoperative. After the output O1 of the controller C1 passes through valve 119 it is fed through pipe 122 to the reset needle valve 123, to the transfer switch TS, and to the set point chamber or portion of a second controller C2.

A second measuring element 1A senses the deviation in a second process variable PV2 from a set or selected value. These changes in the second process variable are converted to changes in a second air pressure by means of a second transmitter 2A and are transmitted by pipe 97A to the process variable portion of the second controller C2 and to the transfer switch TS. The output O2 of the second controller C2 is transmitted by the pipe 111A to the negative feedback portion of the second controller C2, and to the valves 119A and 120A of the second cutout relay CO2. Output of the second controller C2 is conducted through pipe 122A to the reset needle valve 123A of the second controller C2, to the transfer switch TS, and to the motor 3 for the final control element. Motor 3 may well be an air-pressure-operated motor in which the pressure is applied to one face of a diaphragm or bellows which is stressed by a spring on its opposite face. Motor 3 operates the final control element 4 which may be a valve of any type.

The transfer switch TS connects the motor 3 to either the automatically operated means or to the manually operated means for operating the motor. The transfer switch TS is described in greater detail hereinafter. It is operated manually by a handle T1 through a mechanical connection T3.

The means for manually operating the motor 3 comprise an indicator-transmitter unit IT to be described more fully hereinafter. This unit IT contains a pointer which may be manually operated to vary the output pressure PO of the indicator-transmitter IT. Output pressure PO is fed by pipe T55 to the transfer switch TS and is fed back from the transfer switch TS through pipe T50 to the feedback bellows B of indicator-transmitter IT.

Indicator-transmitter IT also contains a clutch TC which is operable by handle T1 so as to free the pointer of the indicator-transmitter IT for free motion or to apply a friction or drag thereto which is sufficient to hold the pointer in its adjusted position. Indicator-transmitter IT also contains a switch RT which adjusts certain parts of the indicator-transmitter IT so that it functions as a receiver or as a transmitter. Clutch TC and switch RT are both actuated by handle T1.

CONTROLLER

Referring to FIG. 2 there is disclosed a controller which may operate as the controller C1 or controller C2 of this invention. This controller is the subject of United States Patent No. 3,099,281; Serial No. 124,623; filed July 17, 1961; in the names of Robert B. Watrous and Charles P. Rohmann; and is assigned to the owner of this invention. Briefly this controller includes a rate unit 99 to which a process variable, such as PV1 or PV2, may be fed through a pipe 100 so as to vary the pressure within the top chamber of case 101 and thereby actuate diaphragm 102 which is connected by rod 104 to diaphragm 103 which cooperates with an exhaust nozzle 105. Air under pressure from a filtered air supply (hereinafter F.A.S.) is supplied by a pipe 95 and a restriction 96 to a conduit 97 which is connected to the conduit containing the exhaust nozzle 105 and to the process variable chamber 24A of the controller. This process variable pressure in pipe 97 is also transmitted by pipe 98 to rate needle valve 106 and by pipe 107 to the middle chamber of the rate unit 99 and to by-pass pipe 108 which contains a switch 109 and a volume 110. If desired and as shown in FIGS. 1A and 1B hereof, the process variable pressure can be applied directly to the pipe 97. In such case, the rate unit 99 and its cooperating parts are omitted.

A set point of pressure, which may be manually varied or, in the case of "cascade" operation, is automatically varied, enters through pipes 93 and 94A to the set point portion of the controller. Any deviation of the process variable pressure in pipe 97 from the set point pressure in pipe 94A causes lever 39A to rock about its pivot and to move the right hand end of 40A of rod 51 so as to actuate pin 71 and flapper 73 relative to nozzle 67. Movement of flapper 73 relative to nozzle 67 varies the nozzle pressure supplied from pipes 80, restriction 70, and pipes 69 and 68 to the upper chamber in the case 83 of the pilot valve 82. Change in the nozzle pressure applied to the upper face of diaphragm 85 actuates perforated block 87 so as to either open the exhaust valve 88 or the inlet valve 91–92 which admits air from the bottom chamber of the pilot valve 82 to the chamber to which the outlet pipe 111 is connected. This is the output pressure O1 or O2 of the controller C1 or C2, respectively.

This output pressure is fed by pipe 111 to the negative feedback portion 24 of the controller and to a valve formed by a stationary port 119 which cooperates with a diaphragm 116. Valve 119 opens or closes the connection between pipe 111 and output pipe 122.

Cutout relay 112 contains a bottom chamber to which air at supply pressure is provided from pipe 80 to the lower face of diaphragm 117. Cutout relay 112 includes a rigid case 114 having at its top a chamber containing as one wall thereof a diaphragm 115. To this chamber variable air pressure may be applied through a conduit 113. The pressure applied to the top face of diaphragm 115 is opposed to the pressure applied to the bottom face of diaphragm 117 so that, when the pressure applied to diaphragm 115 exceeds that applied to diaphragm 117, valve 120 is closed and valve 119 is open. When the pressure on diaphragm 115 is less than that on diaphragm 117, valve 120 is open and valve 119 is closed.

The output pressure of the controller, after it has passed through the cutout relay 112, is fed through the pipe 122 through the reset needle valve 123 and thence to the positive feedback portion of the controller. Pipe 124 connects valve 120 between the middle chamber of the cutout relay 112 and the positive feedback portion of the controller. Therefore, when valve 120 is open, the rest needle 123 is by-passed and is, therefore, inoperative.

TRANSFER SWITCH TS

Referring to FIGS. 3–8 and 11 it will be seen that the transfer switch TS comprises a handle T1 (FIG. 5) mounted in a bearing T2 and attached to an output shaft T3 having a hub T4 attached to it by a screw T5. Hub T4 carries on it and spaced from the axis of rotation of shaft T3, a pin T7 which moves in an arcuate slot T8 in a detent T6. Pin T7 and slot T8 thus provide a lost-motion connection. Detent T6 has a number of indentations T9 in its rim. Two pawls T10 and T11 are biased by a coil spring T12 into engagement with the rim of detent T6 or into one of the indentations T9 therein. Pawls T10 and T11 operate with the indentations T9 to give a yielding restraint to the handle T1 in various points in its path of motion. This restraint occurs at different positions during the clockwise or counter-clockwise movement of handle T1 because of the lost-motion connection.

Output shaft T3 has a gear T3A (FIGS. 6 and 7) on it. In the modification of this invention adapted for the "cascade" mode of operation and shown in FIGS. 1, 7, 8 and 11, the gear T17 has a portion of its teeth T18 cut away as shown at T18A. This cut away portion T18A extends approximately half way across the thickness of the gear T17 and approximately half way around its circumference. That portion of the rim of gear T17 having the series of teeth T18 thereon interrupted by the cut away portion T18A meshes with gears T13 and T14 so as to drive these gears.

Figure 11:
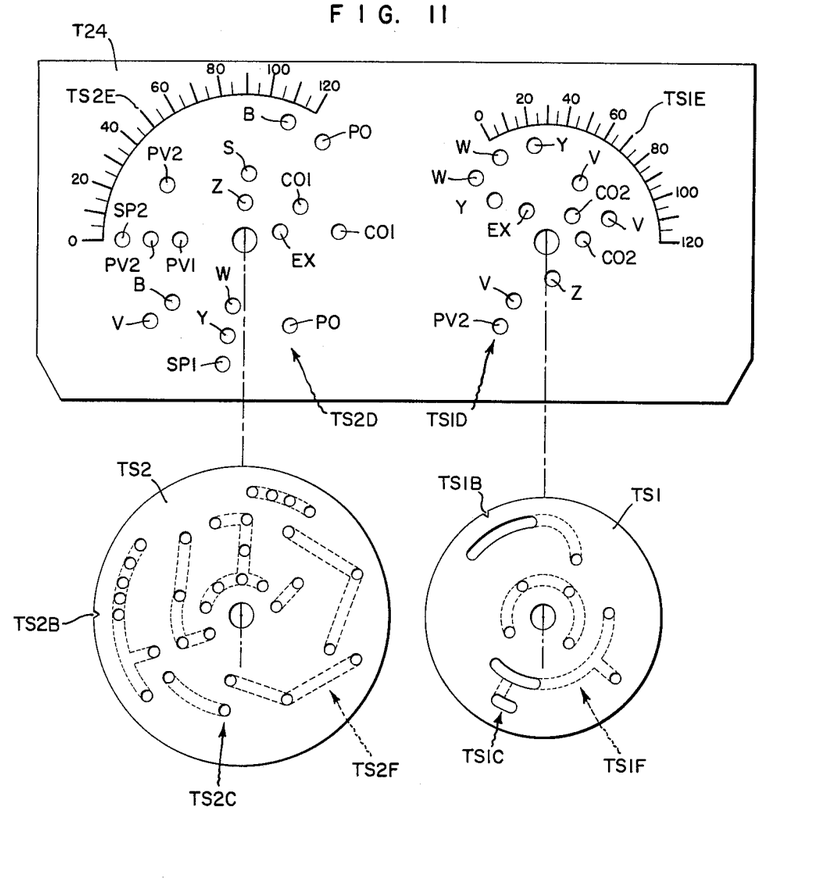
FIG. 11 is a diagram of the transfer switch showing one modification adapted for the "cascade" mode of operation.

Gear T14 drives a movable disc TS1 having a plurality of ports generally indicated TS1C passing through it (FIG. 11). Various of the ports TS1C are connected by conduits generally indicated TS1F in a second disc TS1A (FIG. 3) mounted on disc TS1. Disc TS1 has at its rim an indicator TS1B (FIG. 11) adapted to cooperate with a scale TS1E on the stationary manifold T24 in which the stationary ports generally indicated TS1D are located.

Gear T14 drives a movable switch disc TS1 having a plurality of ports generally indicated TS2C passing through it. Various of the ports TS2C are connected by conduits generally indicated TS2F in a second disc TS2A (FIG. 3) mounted on disc TS2. Ports TS2C cooperate with stationary ports generally indicated TS2D in manifold T24. Disc TS2 has in its rim an indicator TS2B which cooperates with a scale TS2E on manifold T24. The movable switch discs, or plates formed by discs TS1 and TS1A and by discs TS2 and TS2A are spring loaded against manifold T24 by coil springs not shown.

Figure 6:
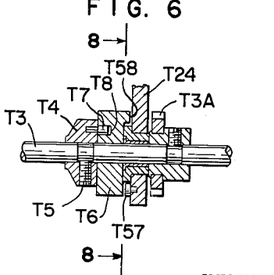
FIG. 6 is a generally vertical, cross section on line 6—6 of FIG. 4 as viewed in the direction of the arrows and showing a detail.
Figure 8:
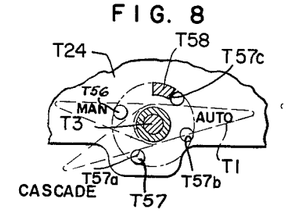
FIG. 8 is a vertical, cross section on line 8—8 of FIG. 6 as viewed in the direction of the arrows, showing a detail and with the handle superimposed and adapted to perform the "cascade" mode of operation in which one controller actuates the set point mechanism of another controller located close to or far from said one controller.

FIGS. 6 and 8 show that chassis T24 has a pair of pin stops T56 and T57 fixedly mounted thereon. Pin stops T56 and T57 cooperate with a movable stop T58 mounted on detent T6 and thereby limit the amount which the handle T1 can be rotated. In the modification adapted for the "cascade" mode of operation the handle T1 can be rotated approximately 240 degrees whereas the discs TS1 and TS2 can each be rotated approximately 120 degrees. Disc TS2 is first rotated 120 degrees and then remains stationary while disc TS1 is rotated 120 degrees, the discs being rotated in sequence.

Figure 3:
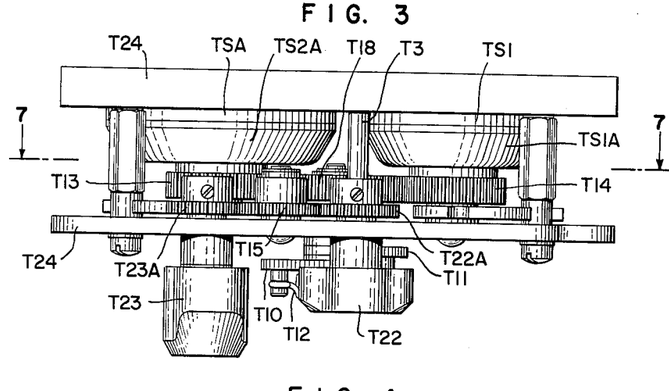
FIG. 3 is a top plan view of the transfer switch forming part of this invention.
Figure 4:
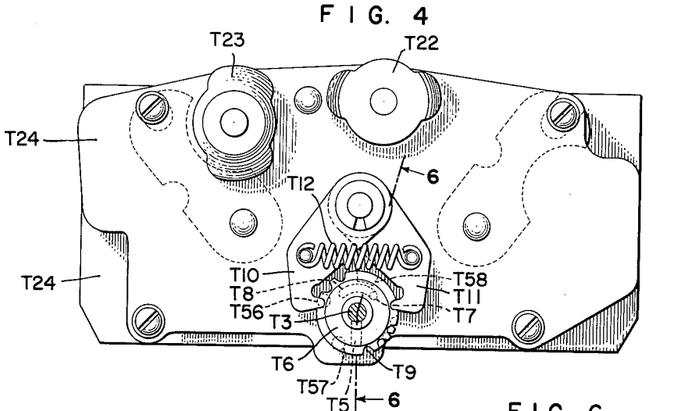
FIG. 4 is a front elevation of the transfer switch.
Figure 5:
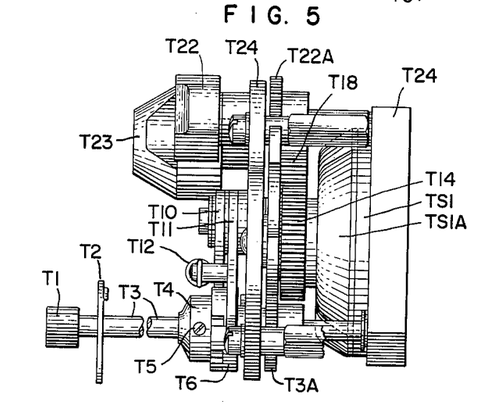
FIG. 5 is a right hand elevation of the transfer switch.
Figure 13:
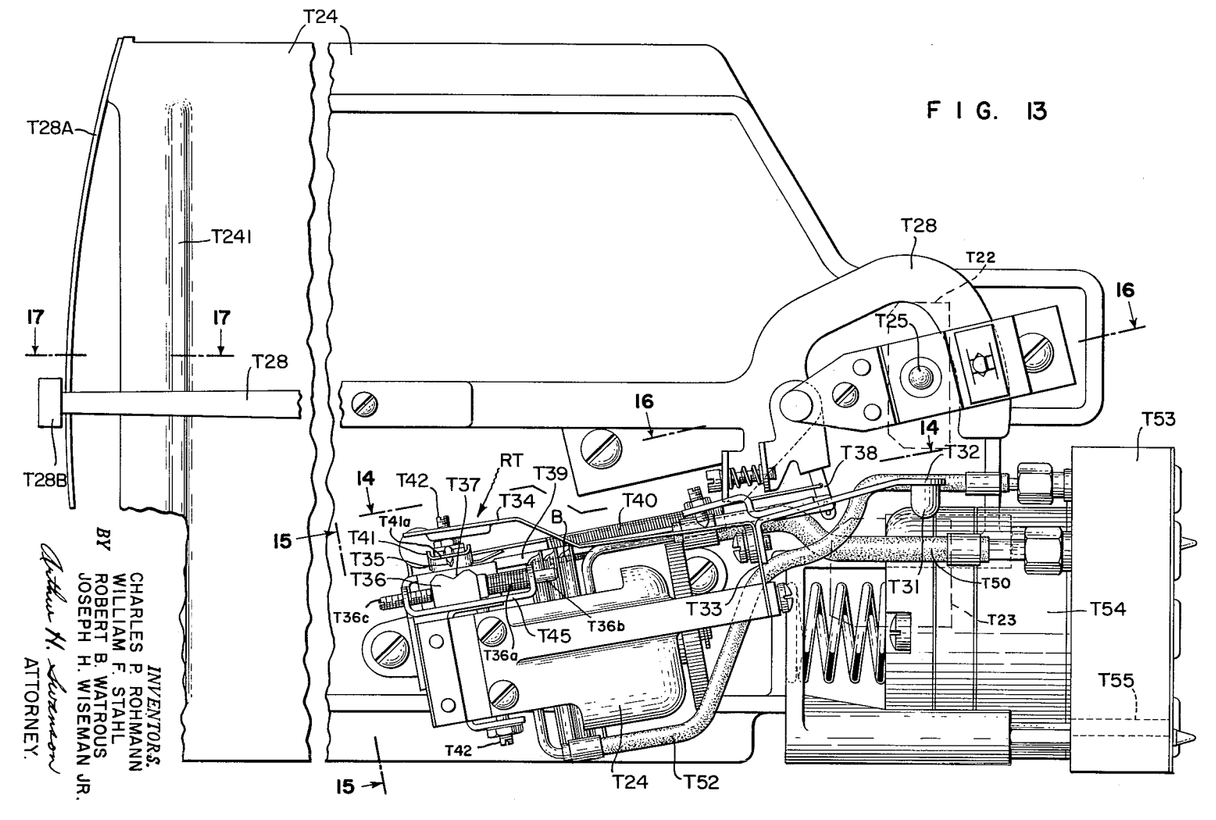
FIG. 13 is a bottom or inverted plan view of the indicator-transmitter.
Figure 14:
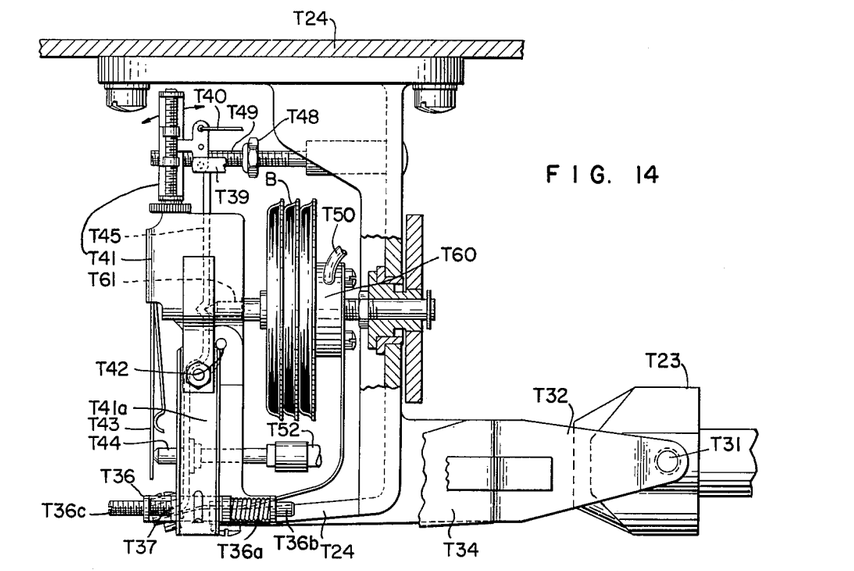
FIG. 14 is a vertical, cross section on line 14—14 of FIG. 13 as viewed in the direction of the arrows.
Figure 15:
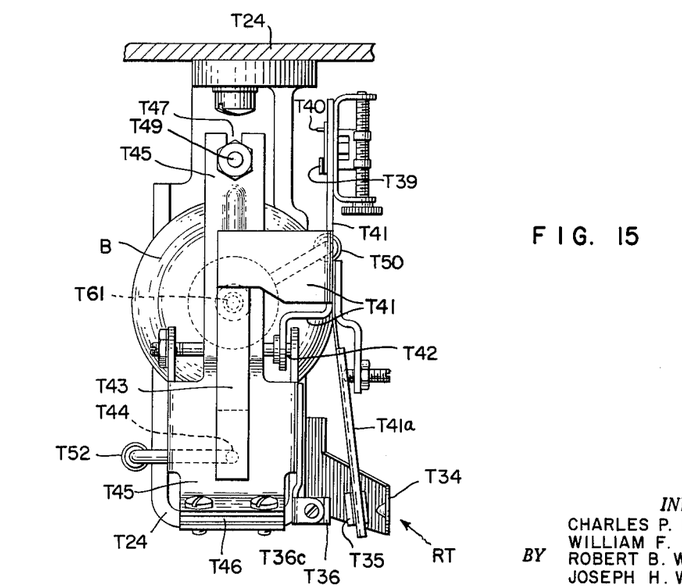
FIG. 15 is a vertical, cross section on line 15—15 of FIG. 13 as viewed in the direction of the arrows.

Referring to FIGS. 3, 4 and 13, cam T23 actuates switch RT by engaging with cam follower T31 which is mounted on lever T32 supported on chassis T24 by leaf spring T33. Lever T34 is also mounted on leaf spring T33 and is clamped to lever T32 so as to be actuated thereby. At its left end, lever T34 engages with flapper lever T41 and causes the V-shaped projection T35 on flapper lever T41 to enter a V-shaped notch T37 in block T36 which is secured to nozzle lever T45. The block T36 is retained in any selected position on nozzle lever T45 by a force exerted by a spring T36a. More specifically, the spring T36a is positioned to retain the opposite ends of the block T36 in engagement with the slidable spindle T36b and the end of an adjustable screw T36c. Engagement between projection T35 and notch T37 locks flapper lever T41 and nozzle lever T45 together so that the two levers operate as one. When the two levers are so engaged, the indicator-transmitter IT operates as a receiver because the flapper T43 cannot move relative to the nozzle T44. When the switch RT is disengaged, the indicator-transmitter IT operates as a transmitter, upon movement of pointer lever T28, because pointer lever T28 moves flapper T43 relative to nozzle T44.

IT

Figures 16, 17:
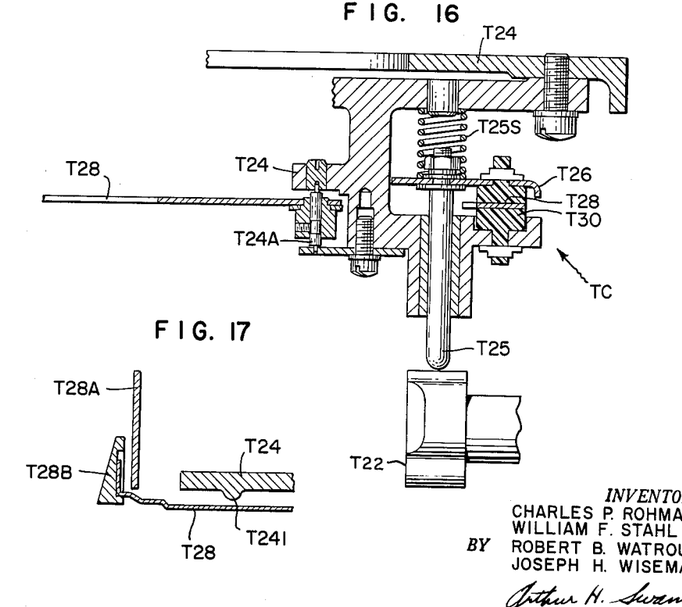
FIG. 16 is a vertical, cross section on line 16—16 of FIG. 13 as viewed in the direction of the arrows.
FIG. 17 is a vertical, cross section on line 17—17 of FIG. 13 as viewed in the direction of the arrows.

Referring to FIGS. 13–17, indicator-transmitter IT includes a chassis or support T24 having a pivot T24A on it (FIG. 16) on which is mounted a pointer lever T28 the left end of which is a pointer T28B cooperating with a scale T28E (FIG. 17). Chassis T24 has, adjacent the front end of the pointer lever T28 and on the lower side of the chassis, a ridge T241 overlying the lever T28. The right end of lever T28 (FIG. 13) has an arm T38 which connects by a link T39 and a spring T40 with a flapper lever T41 (FIGS. 14, 15) which is mounted by a pivot T42 on a nozzle lever T45 which is mounted on chassis T24 by means of a leaf spring pivot T46. Flapper lever T41 carries flapper T43 which moves toward and away from the end of nozzle T44 carried by nozzle lever T45. The upper end of nozzle lever T45 has notch T47 in it through which extends stationary screw T49 on which is adjustably mounted a stop nut T48 which cooperates with one side of the upper end of nozzle lever T45. Nozzle T44 is connected by a flexible conduit T52 with manifold T53 which has a pilot valve or relay T54 having an outlet conduit T55 passing through the manifold T53. The pilot valve or relay T54 is similar to or identical with a pilot 82 of the controller. Pilot valve or relay T54 causes any change in the pressure in the nozzle T44 to be amplified in the outlet conduit T55.

Figure 7:
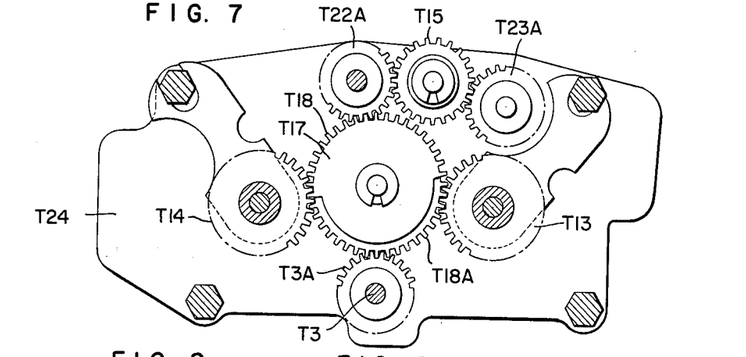
FIG. 7 is a vertical, cross section on line 7—7 of FIG. 3 as viewed in the direction of the arrows.

Indicator-transmitter IT contains a switch RT which causes the indicator-transmitter to act as a receiver by connecting the flapper to the nozzle so that the flapper cannot move relative to the nozzle or causes the indicator-transmitter to act as a transmitter by disconnecting the flapper from the nozzle so that the flapper may be moved relative to the nozzle by moving the pointer lever T28 manually. For a description of the manually operable means for actuating the switch RT and the clutch TC reference may be had to FIGS. 3, 4, 5, 7 and 8. Handle T1 (FIG. 5) is mounted in bearing T2 so as to actuate output shaft T3. Output shaft T3 has fast on it gear T3A which has gear teeth (FIG. 7). Gear T3A meshes with and drives the gear T17 which has gear teeth T18 on its rim. Teeth T18 mesh with and drive gear T22A which drives gear T15 which drives gear T23A. Gear teeth T22A drives cam T22 which operates clutch TC. Gear T23A drives cam T23 which operates switch RT.

Cam T22 actuates cam follower T25 (FIG. 16) against the stress of coil spring T25S. Cam follower T25 carries an arm T26 on which is mounted a first clutch face T27 adapted to engage one face of pointer lever T28 and to yieldingly engage the opposite face of pointer lever T28 with a second clutch face T30 mounted on chassis T24. When clutch faces T27 and T30 engage pointer lever T28 the front end of pointer lever T28 engages with the ridge T241 facing the front end of this pointer lever. This action permits pointer lever T28 to be turned by hand to overcome the friction of clutch faces T27 and T30 and of ridge T241 but this friction will hold the pointer lever T28 in whatever position it is moved to. When it is desired to have the indicator-transmitter IT act as a receiver, the clutch TC is disengaged and the pointer lever T28 is free to oscillate about its pivot T24A.

OPERATION

The operation of this invention may best be explained by reference to FIG. 11 which is a diagram in which the chassis or manifold T24 has a plurality of stationary ports, generally designated TS1D and TS2D passing through it. Various air pressures are applied to various of the ports TS1D and TS2D as is shown hereinafter in the following Tabulation of legends. Ports V, W, Y and Z appear in both the groupings of ports TS1D and TS2D and serve to connect various ports of these two groupings together through the chassis or manifold T24. The discs TS1 and TS2 are drawn as though they were transparent. That is to say, the ports TS1C and TS2C, which cooperate with the stationary ports TS1D and TS2D, are shown in solid lines while the conduits TS1F and TS2F, which connect various of the ports TS1C and TS2C together, are shown in dotted lines. Disc TS1 carries in its rim an indicator TS1B adapted to cooperate with a scale TS1E. Disc TS2 has in its rim an indicator TS2B adapted to cooperate with scale TS2E. A convenient way of using FIG. 11 is to make a tracing of disc TS1 and of disc TS2 on transparent paper and to mount the disc TS1 so that it has the same center as the stationary ports TS1D and to mount disc TS2 so that it has the same center as the stationary ports TS2D. The discs TS1 and TS2 can then be rotated by comparing the indicator TS1B with the scale TS1E and the indicator TS2B with the scale TS2E. That is the way in which the following tables were constructed.

Tabulation of legends

Figures 9, 10:
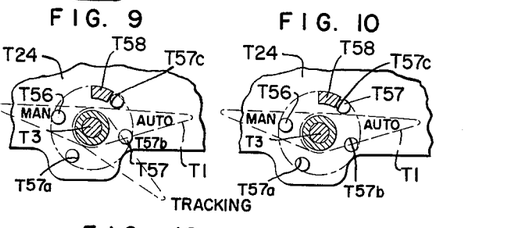
FIG. 9 is a cross section similar to FIG. 8 showing a modification adapted to perform the "tracking" mode of operation in which the set point mechanism of a controller may be actuated.
FIG. 10 is a cross section similar to FIG. 8 showing a modification adapted to perform the "manual-automatic" mode of operation.

X—Valve 119, 119A, 120, or 120A closed
O—Valve 119, 119A, 120, or 120A open
H—Pointer lever T28 held by clutch TC
R—Pointer lever T28 released
T—IT is transmitter
RE—IT is receiver
S—Chamber is sealed
ST—Detent T6 engages pin T56 or T57
D—Detent T6 engages pawl T10 or T11
PV1—Process variable pressure fed to controller C1
SP1—Set point pressure of controller C1
O1—Output pressure of controller C1
CO1—Actuating pressure for cutout relay CR1
PV2—Process variable pressure fed to controller C2
SP2—Set point pressure of controller C2
O2—Output pressure of controller C2
CO2—Actuating pressure for cutout relay CR2
IT—Indicator-transmitter
PO—Output pressure of IT pilot valve
B—Feedback pressure in IT bellows
V—Pressure applied to valve
EX—Exhaust to atmosphere
EXT—External set point-tracking operation When the transfer switch is adapted for the manual-automatic mode of operation the pins T56 and T57 are arranged as shown in FIG. 10 so that they limit the rotation of movable stop T58 and consequently the rotation of detent T6 and of handle T1 to the extent of movement of stop T58 between pins T56 and T57. T57 is shown in fixed pressed-in engagement with aperture T57a. Additional apertures T57b and T57c are shown in the chassis T24 to accommodate the different location of the pin T57, as shown in FIGS. 9 and 10. In the manual-automatic mode of operation the cut away portion T18A of the gear T17 is omitted. Handle T1 can be rotated so as to turn disc TS1 120 degrees. In FIG. 10 the handle T1 is shown with the device in automatic position. The indicator TS1B on disc TS1 is at 120 degrees on scale TS1E. When the handle T1 is rotated counter-clockwise, as seen in FIG. 10, disc TS1 is also rotated counter-clockwise so that indicator TS1B moves to 0 degrees on scale TS1E which places the device in manual position. The following tabulation headed Manual-automatic shows the operations which take place in the various parts of this invention during this operation.

*Manual-automatic*

| Operation | Position of Disc TS1 | Common Points | Set Point Controller | Cutout Relay Valve 119 | Cutout Relay Valve 120 | IT Clutch TC | IT RT Receiver-Transmitter | Valve Motor 3 | Detent T6 |
|---|---|---|---|---|---|---|---|---|---|
| Automatic | 120 | PO-B-SP2 | PO | O | X | H | T | O2 | ST |
| Switching | 107 | PO-B | S | O | X | H | T | O2 | |
| | 98 | PO-B | S | X | O | H | T | S | |
| | 88 | PV2-B | S | X | O | H | RE | S | |
| | 83 | PV2-B | S | X | O | R | RE | S | |
| | 72 | PV2-B | S | X | O | R | RE | O2 | |
| | 57 | | S | O | X | R | RE | O2 | |
| | 48 | B-V | S | O | X | R | RE | O2 | |
| | 40 | B-V | S | O | X | R | RE | O2 | D |
| | 35 | B-V | S | O | X | R | RE | O2 | |
| | 30 | B-V | S | O | X | H | T | O2 | |
| | 26 | PO-B | S | O | X | H | T | O2 | |
| | 17 | PO-B | PV2 | X | O | H | T | S | |
| | 13 | PO-B | PV2 | X | O | H | T | S | D |
| Manual | 9 | PO-B-V | PV2 | X | O | H | T | PO | |
| | 0 | | | | | | | | ST |

Manual-automatic

| Operation | Position of Disc TS1 | Common Points | Set Point Controller | Cutout Relay Valve 119 | Cutout Relay Valve 120 | IT Clutch TC | IT RT Receiver-Transmitter | Valve Motor 3 | Detent T6 |
|---|---|---|---|---|---|---|---|---|---|
| Manual Switching | 0 | PO-B-V | PV2 | X | O | H | T | PO | ST |
| ↓ | 13 | PO-B | PV2 | X | O | H | T | S | |
| | 20 | PO-B | S | O | X | H | T | O2 | |
| | 28 | B-V | S | O | X | H | T | O2 | |
| | 32 | B-V | S | O | X | H | RE | O2 | |
| | 37 | B-V | S | O | X | R | RE | O2 | |
| | 51 | B-V | S | O | X | R | RE | O2 | |
| | 64 | | S | X | O | R | RE | S | |
| | 73 | PV2-B | S | X | O | R | RE | S | |
| | 80 | PV2-B | S | X | O | R | RE | S | D |
| | 85 | PV2-B | S | X | O | H | RE | S | |
| | 90 | PV2-B | S | X | O | H | T | S | |
| | 94 | PO-B | S | X | O | H | T | S | |
| | 107 | PO-B | S | O | X | H | T | O2 | D |
| Automatic | 112 | PO-B-SP2 | PO | O | X | H | T | O2 | |

The operation of the "cascade" mode of operation modification of the invention is as follows and is shown in FIGS. 8 and 11. In this modification the gear T17 has a portion of its teeth cut away as shown at T18A in FIG. 7. Starting with the handle T1 in the position in which it is shown in FIG. 8 and with the device in the automatic position, the handle T1 is turned clockwise until the movable stop T58 engages the pin stop T56 the device is in the manual position. The sequence of operations which takes place during the transfer from automatic to "cascade" and return is shown in the attached tabulation headed "Cascade."

Cascade

| Common Points Automatic | Position of Disc TS1 | Position of Disc TS2 | Set Point SP1 | Set Point SP2 | Cutoff Relay 1 Controller Output | Cutoff Relay 1 Rest Bypass | Cutoff Relay 1 Controller Output | Cutoff Relay 1 Rest Bypass | Clutch TC | Receiver-Transmitter RT | Valve Motor 3 | Detent T6 |
|---|---|---|---|---|---|---|---|---|---|---|---|---|
| PO-B-SP2 | 120 | 0 | S | PO | X | O | O | X | H | T | O2 | D |
| PO-B | 120 | 7 | S | S | X | O | O | X | H | T | O2 | |
| PO-B | 120 | 12 | S | S | X | O | X | O | H | T | S | |
| PO-B | 120 | 24 | S | S | X | O | X | O | H | T | S | |
| PV2-B | 120 | 33 | S | S | X | O | X | O | H | T | S | |
| PV2-B | 120 | 37 | S | S | X | O | X | O | H | RE | S | |
| PV2-B | 120 | 42 | S | S | X | O | X | O | R | RE | S | |
| PV2-B | 120 | 49 | S | S | X | O | X | O | R | RE | S | |
| PV1-B | 120 | 72 | S | S | X | O | X | O | R | RE | S | |
| PV1-B-SP1 | 120 | 75 | PV1 | S | X | O | X | O | R | RE | S | |
| | 120 | 78 | PV1 | S | X | O | X | O | R | RE | S | D |
| | 120 | 80 | PV1 | S | X | O | X | O | H | RE | S | |
| PV1-B-SP1 | 120 | 85 | PV1 | S | X | O | X | O | H | T | S | |
| PO-B | 120 | 89 | S | S | X | O | X | O | H | T | S | |
| PO-B | 120 | 107 | S | S | X | O | O | X | H | T | O2 | |
| PO-B-SP1 | 120 | 115 | PO | O1 | O | X | O | X | H | T | O2 | D |

Cascade

Figure 12:
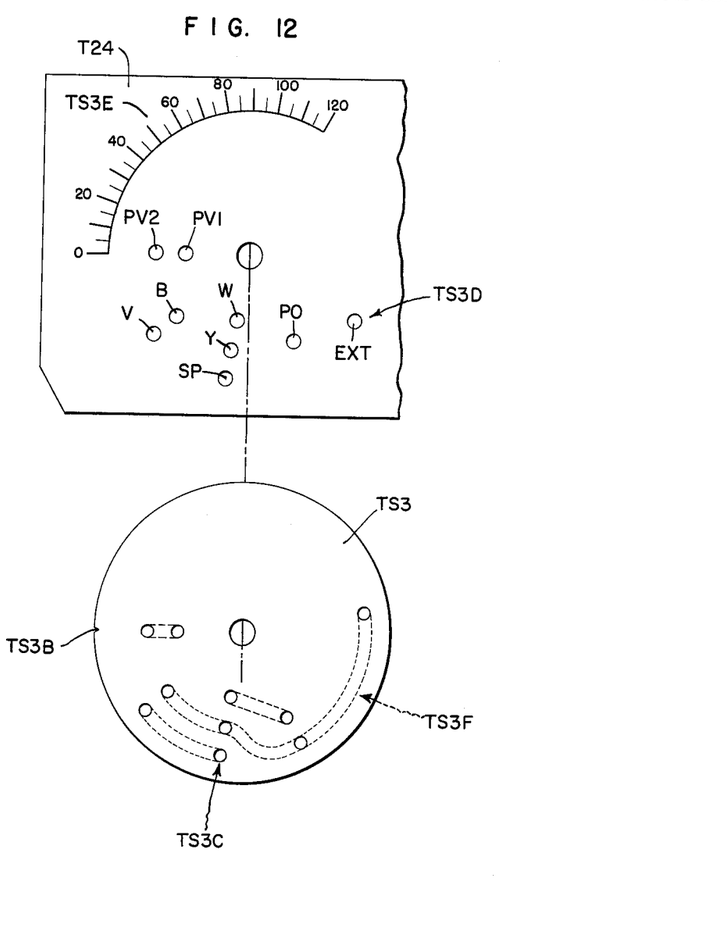
FIG. 12 is a diagram of the transfer switch showing a second modification adapted for "tracking" operation.

| Common Points Automatic | Position of Disc TS1 | Position of Disc TS2 | Set Point SP1 | Set Point SP2 | Cutoff Relay 1 Controller Output | Cutoff Relay 1 Rest Bypass | Cutoff Relay 1 Controller Output | Cutoff Relay 1 Rest Bypass | Clutch TC | Receiver-Transmitter RT | Valve Motor 3 | Detent T6 |
|---|---|---|---|---|---|---|---|---|---|---|---|---|
| Cascade PO-B-SP1 | 120 | 120 | PO | O1 | O | X | O | X | H | T | O2 | ST |
| PO-B | 120 | 113 | S | S | X | O | O | X | H | T | O2 | |
| PO-B | 120 | 107 | S | S | X | O | X | O | H | T | S | |
| PO-B | 120 | 97 | S | S | X | O | X | O | H | T | S | |
| PV1-B-SP1 | 120 | 88 | PV1 | S | X | O | X | O | H | T | S | |
| PV1-B-SP1 | 120 | 84 | PV1 | S | X | O | X | O | H | RE | S | |
| PV1-B-SP1 | 120 | 79 | PV1 | S | X | O | X | O | R | RE | S | |
| PV1-B-SP1 | 120 | 74 | PV1 | S | X | O | X | O | R | RE | S | |
| PV2-B | 120 | 48 | S | S | X | O | X | O | R | RE | S | |
| PV2-B | 120 | 42 | S | S | X | O | X | O | R | RE | S | D |
| PV2-B | 120 | 40 | S | S | X | O | X | O | N | RE | S | |
| PV2-B | 120 | 35 | S | S | X | O | X | O | N | T | S | |
| PV2-B | 120 | 32 | S | S | X | O | X | O | N | T | S | |
| PO-B | 120 | 23 | S | S | X | O | X | O | H | T | S | |
| PO-B | 120 | 13 | S | S | X | O | X | O | H | T | S | D |
| PO-B | 120 | 11 | S | S | X | O | O | X | H | T | O2 | |
| PO-B-SP2 | 120 | 5 | S | PO | X | O | O | X | H | T | O2 | |
| Automatic | 120 | 0 | | | | | | | | | | D | able stop T58 engages the pin stop T57. The device is then in the "cascade" position. The handle T1 can be then rotated counter-clockwise to turn the device from the "cascade" position to the automatic position. If desired the handle T1 can be continued in its counter-clockwise movement and thereby rotate the disc TS1 120 degrees while the disc TS2 remains stationary. This will move the device from the automatic position to the manual position FIG. 12 is a diagram useful in explaining the operation when the invention is performing the tracking mode of operation. FIG. 12 shows the left half of the chassis or manifold T24 having a plurality of stationary ports generally indicated TS3D passing through it. Various pressures are applied to various of these ports as shown by the legends attached thereto having reference to the above Tabulation of legends. Movable switch disc TS3 has a plurality of ports generally indicated TS3C passing through it. Various of these ports TS3C are connected by conduits generally indicated TS3F. Disc TS3 has at its rim an indicator TS3B which cooperates with a scale TS3E on the stationary manifold or chassis T24.

FIG. 2 is a simplified diagram useful in explaining the operation when the invention is performing the manual to automatic transfer or vice versa. FIG. 2 shows the indicator-transmitter IT having a conduit through which the output pressure PO flows. The transfer switch TS is manually operable and has a part diagrammatically illustrated at TS3 which can be shifted between automatic position A and manual position M. Pipes 93 and 94A connect transfer switch part TS3 with the set point portion of the controller. Pipe 93 contains a transfer switch part TS4 which is adapted to open or close communication through pipe 93 and thus connects the output pressure PO of the indicator-transmitter IT with the set point portion of the controller so that the output pressure PO of the indicator-transmitter IT may become the set point pressure SP2 applied to the set point portion of the controller.

Pipe 97 contains another transfer switch part TS5 adapted to open or close the connection between pipe 97 and pipe 93 so that the process variable pressure PV2 can be applied to the set point portion of the controller, if desired.

The stationary portion of the transfer switch portion TS3 is connected by pipe 122 with the pneumatically operated motor 3 which operates the final control element 4 so that the valve pressure V may be provided by the output pressure PO of the indicator-transmitter IT.

The cut-out relay 112 has an input pipe 113 which communicates with a filtered air supply F.A.S. through a transfer switch part TS7. Pipe 113 also communicates with the exhaust EX through a transfer switch part TS8. Transfer switch parts TS7 and TS8 govern the supply of an operating pressure CO2 to the cut-out relay 112 or connect the operating chamber of the cut-out relay 112 to atmosphere through the exhaust EX. Cut-out relay 112 contains a valve 119 which, when it is open, connects the output pressure of the pilot valve 82 through the pipe 111 to the pipe 122. Cut-out relay 112 also contains a valve 120 which, when it is open, opens a pipe 124 in parallel with reset needle valve 123 so that, when valve 120 is open, the reset needle valve is inoperative because its resistance is so much higher than that of the open pipe section 124.

The following tabulation "Table of transfer switch TS positions" shows whether or not the various transfer switch parts are open or closed in the various positions of the device of this invention, which positions are: automatic; intermediate; or manual.

*Table of transfer switch TS positions*

| Operation Position | TS3 | TS4 | TS5 | TS6 | TS7 | TS8 | 119 | 120 |
|---|---|---|---|---|---|---|---|---|
| Automatic | A | O | X | X | O | X | O | X |
| Intermediate | A | X | X | X | O | X | O | X |
| Manual | M | X | X | O | O | X | O | O |

The operation of the device of this invention, when the final control element 4 is to be shifted from automatic to manual operation or vice versa, is as follows.

Starting from the automatic position, as shown in FIG. 2, TS3 is connected to the stationary position A and TS4 is open so that the output pressure PO of the indicator-transmitter IT forms the set point pressure SP2 applied to the set point portion of the controller. This set point pressure SP2 is balanced against the process variable pressure PV2 in the process variable portion 24A of the controller. Any difference between these two pressures causes the controller to operate in its intended manner and varies the pressure applied through pipe 122 to the air-pressure-operated motor 3 which operates the final control valve 4. Valve 119 of cut-out relay 112 is open to permit the passage of the output pressure from the pilot relay 82 to pass to the air-pressure-operated motor 3.

When it is desired to switch control of the final control element 4 from the automatic position to the manual position transfer switch TS is operated by manually operable handle TI (FIGS. 1B and 10) so as to close TS4 and open TS5. All the other transfer switch parts remain in the same position as in automatic mode of operation. Closing part TS4 and opening part TS5 applies process variable pressure PV2 in pipe 97 to the set point portion of the controller. Since the process variable pressure PV2 is applied to both sides of the capsule between the process variable portion 24A and the set point portion of the controller, the beam 39A is locked in its set position and remains there until a difference in pressure is supplied to the inner end of the beam 39A. This action in effect constitutes a memory since the position of the beam 39A remains in the position in which it was when a shift was made when the controller was moved out of its automatic position.

To shift the device from intermediate to manual position, the transfer switch part TS3 is switched from the A position to the M position and transfer switch part TS6 is opened so that the output pressure PO of the indicator-transmitter IT forms the pressure to be applied to the air-pressure-operated motor 3 of the final control valve 4.

Transfer switch parts TS4 and TS5 remain closed and open, respectively, so that the process variable pressure

*Tracking*

| Common Points Automatic | Disc TS1 | Disc TS2 | Set Point SP2 | Cutoff Relay 2 | | Clutch TC | Receiver-Transmitter RT | Value Motor 3 | Detent T6 |
|---|---|---|---|---|---|---|---|---|---|
| | | | | Value 119A | Valuve 120A | | | | |
| PO-B-SP2 | | | | | | | | | |
| PV1-PV2 | 120 | 0 | PO | O | X | H | T | O2 | D |
| PV1-PV2 | 120 | 7 | S | O | X | H | T | O2 | |
| | 120 | 10 | S | O | X | H | RE | O2 | |
| | 120 | 34 | | O | X | H | RE | O2 | |
| | 120 | 36 | | O | X | R | RE | O2 | |
| EXT-SP2 | 120 | 38 | O1 | O | X | R | RE | O2 | |
| EXT-SP2 | 120 | 40 | O1 | O | X | R | RE | O2 | ST |
| | 120 | 35 | | | | H | RE | O2 | |
| | 120 | 33 | | | | H | T | O2 | |
| PV2-PV1 | 120 | 9 | | | | | | | |
| PO-B-SP2 | | | | | | | | | |
| PV1-PV2 | 120 | 6 | | | | H | T | O2 | |
| PV1-PV2 | 120 | 0 | | | | H | T | O2 | D |

PV2 is locked in and applied to both sides of the diaphragm separating process variable chamber 24A from the set point portion of the controller. The beam 39A therefore remains locked in the position which it occupied when the device was last in automatic position.

Transfer switch TS8 is open and transfer switch part TS7 is closed so that the operating pressure CO2 from the filtered air supply F.A.S. is cut off. Instead, the air in the chamber cut-out relay 112 is bled to exhaust EX through the transfer switch part TS8. This operation causes valve 119 to close and valve 120 to open. Opening valve 120 renders reset needle valve 123 inoperative because of its relatively high resistance compared with the relatively low resistance of the parallel portion of pipe 124 connecting to the position feedback chamber.

The sequence of operation in shifting in the reverse direction from manual to automatic is the opposite to that just described.

What is claimed is:

1. In an air-pressure-operated automatically or manually-actuated mechanism for operating a final control element, means for shifting between automatic actuation and manual actuation without disturbing the pressure of the air being impressed on the final control element at the time of shift, said manual-to-automatic shifting means including an air-pressure-operated controller adapted to produce a variable air pressure, an indicator-transmitter having a unitary distensible member, a lever in said indicator-transmitter having a pointer at one end operably connected for movement with the distensible member to indicate the magnitude of an input pressure being transmitted to the distensible member while said indicator-transmitter is operated as a receiver, a flapper-nozzle valve mechanically connected for movement with the non-pointer end of the lever to vary the pressure of a supply of air under pressure forming the output signal of said indicator-transmitter when the indicator-transmitter is operated as a transmitter, means to apply the output signal as a feedback pressure to the distensible member when the indicator is operated as a transmitter, a transfer switch to connect said controller or said indicator-transmitter to a final control element so as to actuate the final control element automatically or manually, the transfer switch having a manifold containing a plurality of stationary ports and a rotatable disc having a plurality of ports cooperating with said stationary ports to open and close communication therebetween, and a rotatable manually-operable means connected to said transfer switch for effecting continuous movement of the transfer switch from the manually-operated first transmitting position through a receiving position to an automatically-operated second transmitting position.

2. The apparatus defined by claim 1, further comprising a rotatable cam-actuated switch operably positioned to fixedly connect the flapper to the nozzle when said indicator-transmitter is employed to function as a receiver and said switch being operable to disconnect the flapper from the nozzle for movement toward and away from the nozzle by the lever when the flapper is operated as a transmitter.

3. The apparatus defined by claim 1, further comprising a rotatable cam-actuated clutch operably connected to apply a sliding friction to the non-indicating end of said pointer lever when the indicator-transmitter is employed as a transmitter and said cam-actuated clutch being further operably connected to be moved free of the non-indicating end of the pointer lever when said indicator-transmitter is being employed as a receiver.

4. An air-pressure-operated mechanism for operating a final control element, comprising an indicator-transmitter for manually operating the final control element, means for shifting between automatic actuation and manual actuation without disturbing the pressure of the air being impressed on the final control element at the time of shift, an indicating scale associated with the indicator-transmitter, a pointer lever pivotally mounted on said indicator-transmitter for manual movement along the scale, a flapper lever pivotally mounted on said indicator-transmitter, a flapper mounted on said flapper lever for movement therewith, a nozzle lever pivotally mounted on said indicator-transmitter, a nozzle mounted on said nozzle lever for movement therewith and having air under pressure applied thereto through a restriction, a connection between the non-indicating end of the pointer lever and said flapper whereby said pointer lever may be manually moved as a handle to actuate said flapper relative to said nozzle, a pilot valve connected under the control of the pressure of the air in said nozzle and adapted for connection to a supply of air under pressure so as to amplify the pressure of the air under the control of said nozzle that the indicator-transmitter applies to the final control element, a feedback bellows, a connection between the air under pressure being applied to the final control element and the bellows when the indicator-transmitter is operated as a transmitter, the feedback bellows being mounted on said indicator-transmitter and engaging said nozzle lever so as to move said nozzle closer to said flapper as said flapper moves closer to said nozzle and vice versa, a clutch associated with the indicator-transmitter and operably connected to apply a sliding friction to the non-indicating end of the pointer lever as the pointer lever is moved along the scale, said lever having a pointer at one end operably connected for movement with the bellows to indicate the magnitude of an input pressure being transmitted to the bellows while said indicator-transmitter is operated as a receiver.

5. The apparatus defined in claim 1, wherein a first portion of the rotatable manually-operated means is provided with a pin protruding therefrom, a disc positioned immediately adjacent the first portion to form a second portion of the manually-operated means, an arcuate slot formed in an outside portion of the disc to accommodate the non-driving movement of the pin therein during the initial movement of the first portion of the manually-operated means, a detent on the opposite side of the disc, and a pair of stationary pins positioned in the same plane as the detent but circumferentially spaced therefrom to form stops between which the first portion can drive the detent positioned on the second portion after the pin is brought into engagement with either end of the slot.

References Cited by the Examiner

UNITED STATES PATENTS

| | | | |
|---|---|---|---|
| 1,604,592 | 10/1926 | Merry | 137—625.21 |
| 2,498,651 | 2/1950 | Crom | 74—504 |
| 2,550,666 | 5/1951 | Bilyeu | 137—84 |
| 2,637,342 | 5/1953 | Shannon | 251—26 |
| 2,660,904 | 12/1953 | Hilsinger | 74—504 |
| 2,664,915 | 1/1954 | Drinker | 251—26 |
| 2,737,963 | 3/1956 | Gorrie et al. | 137—85 |
| 2,741,265 | 4/1956 | Poor | 137—625.11 |
| 2,763,278 | 9/1956 | Eller | 137—82 |
| 2,827,924 | 3/1958 | Towler | 137—625.11 |
| 2,939,472 | 6/1960 | Eller | 137—82 |
| 2,969,080 | 1/1961 | Mamzic | 137—84 |
| 3,078,738 | 2/1963 | Siegel | 137—85 X |
| 3,099,281 | 7/1963 | Watrous et al. | 137—86 |

M. CARY NELSON, *Primary Examiner.*

MARTIN P. SCHWADRON, *Examiner.*